Feb. 2, 1971 — H. R. BEURRIER ET AL — 3,560,882
PARAMETRIC ACOUSTIC WAVE SENSOR
Filed Aug. 25, 1969 — 3 Sheets-Sheet 1

INVENTORS H. R. BEURRIER
H. SEIDEL
BY
*Sylvan Sherman*
ATTORNEY

United States Patent Office 3,560,882
Patented Feb. 2, 1971

3,560,882
PARAMETRIC ACOUSTIC WAVE SENSOR
Henry R. Beurrier, Chester Township, Morris County, and Harold Seidel, Warren, N.J., assignors to Bell Telephone Laboratories, Incorporated, Murray Hill and Berkeley Heights, N.J., a corporation of New York
Filed Aug. 25, 1969, Ser. No. 852,795
Int. Cl. H03c 1/46
U.S. Cl. 332—2                                                     6 Claims

ABSTRACT OF THE DISCLOSURE

An electromagnetic parametric acoustic wave sensor comprising a reactive bridge which is energized by means of a high frequency pump signal. In the absence of an acoustic wave, the bridge is balanced, producing no output signal. In the presence of an acoustic wave the bridge is unbalanced, producing a double sideband, suppressed carrier output signal. The latter is coupled to a phase detector, along with a component of pump signal, wherein an electrical replica of the acoustic input signal is produced.

---

This invention relates to parametric acoustic wave sensors.

BACKGROUND OF THE INVENTION

The typical sound detector presently employed comprises a diaphragm which directly actuates a piezoelectric transducer. The latter, in turn, develops an electrical output which is coupled to an electronic amplifier. It is a characteristic of such a detection system that the signal-to-noise ratio varies as a third or fourth power of the frequency, resulting in extremely poor low frequency performance.

To compensate for this poor low frequency performance, the practice is to increase the size of the diaphragm so as to capture more of the incident wave energy and, thereby, to increase the signal-to-noise ratio. The result of this practice, however, is to reduce the high frequency response of the system.

The above described limitation in the performance of the "piezoelectric-electronic amplifier" type of sound detector is fundamental and cannot be improved beyond whatever improvement can be obtained by selecting the best transducer and amplifier.

SUMMARY OF THE INVENTION

The present invention is an all electronic acoustic wave sensor which avoids the inherent limitation in prior art electronic sensors by the application of the principles of parametric amplification. Similar techniques are employed in the mechanical microphone described in U.S. Pat. 3,435,260.

A first embodiment of the present invention comprises a reactive bridge, one branch of which includes an acoustic wave transducer, such as a condenser microphone. The bridge, which is balanced in the absence of an acoustic signal, is electrically energized by means of an alternating current pump signal. However, because it is balanced, no output is produced. In the presence of an acoustic signal, however, the capacitance of the condenser microphone is modulated, unbalancing the bridge and, thereby, producing a double sideband, suppressed carrier output signal. The latter is coupled, along with a component of the pump signal, to a phase detector whose output is an electrical replica of the acoustic input signal.

In a second embodiment of the invention, the high frequency pump signal is frequency modulated by the acoustic wave and the reactive bridge comprises a pair of 3 db quadrature hybrid couplers interconnected by means of a pair of wavepaths of substantially different electrical length. In the absence of an acoustic wave, the pump signal frequency and bridge path lengths are such that no output signal is derived from the bridge. In the presence of an acoustic signal the pump frequency varies, producing a large relative phase shift between the signal coupled to the output hybrid of the reactive bridge, resulting in a bridge output signal.

It is an advantage of the present invention that the frequency conversion produced by the bridge introduces a power gain at the input to the detector that is proportional to the square of the ratio of the pump frequency to the acoustic signal frequency. Since this ratio can be very large, i.e., of the order of 100:1 or greater, available gain of the order of 40 decibels or more can be easily realized. Furthermore, this available gain increases as the signal frequency decreases, thus producing a signal-to-noise ratio for the system which increases as the frequency decreases, in contradiction to prior art sound detectors which are characterized by signal-to-noise ratios which decrease with decreasing signal frequency. These and other objects and advantages, the nature of the present invention, and its various features, will appear more fully upon consideration of the various illustrative embodiments now to be described in detail in connection with the accompanying drawings.

DETAILED DESCRIPTION

Figure 1:
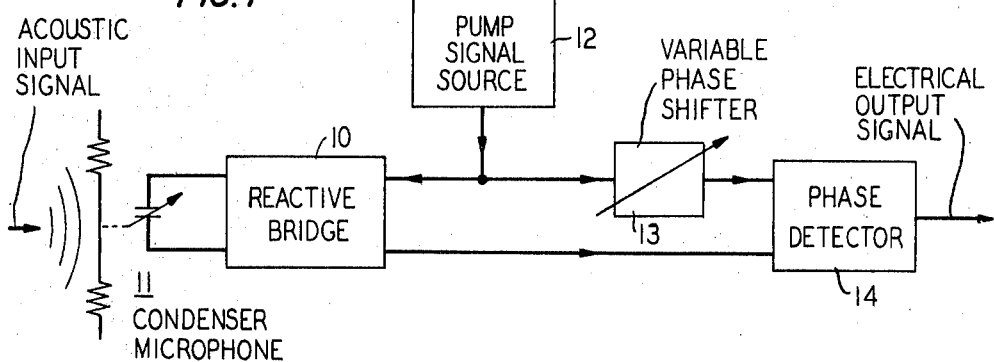
FIG. 1 shows, in block diagram, a first embodiment of an acoustic wave sensor in accordance with the present invention.

Referring to the drawings, FIG. 1 shows, in block diagram, an acoustic wave sensor comprising a reactive bridge 10, one branch of which includes an acoustic wave transducer, such as a condenser microphone 11; a high frequency pump signal source 12; a variable phase control 13; and a phase detector 14.

The term "acoustic" wave, as used herein, shall be understood to mean any mechanical wave and is not intended to be limited to such waves as fall within the audible range of frequencies.

Figure 2:
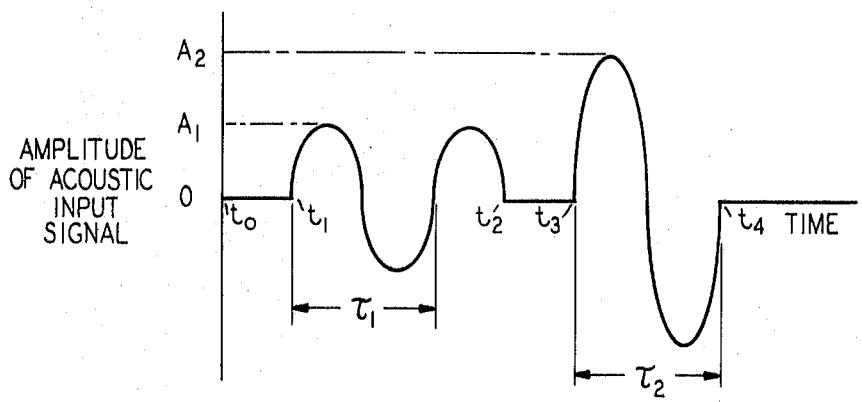
FIGS. 2 and 3, included for purposes of explanation, show the amplitude variations of the acoustic input signal and the amplitude variations of the bridge output signal.
Figure 3:
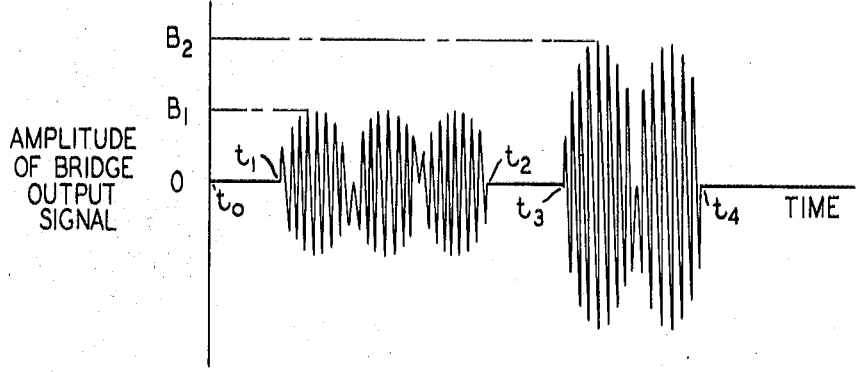

As shown in FIG. 1, a component of the pump signal is coupled to the reactive bridge which, in the absence of an acoustic input signal, is balanced, producing no output. If, however, an acoustic signal is made to impinge upon condenser microphone 11, the bidge is unbalanced, causing a high frequency signal to appear at the bridge output. The amplitude of this signal and the interval of time over which it persists, depends upon the amplitude and duration of the acoustic input signal. To illustrate, FIG. 2 shows a particular input signal consisting of one and one-half cycles of a sinusoidal wave of period $\tau_1$ and a maximum amplitude $A_1$, followed by an off period from time $t_2$ to $t_3$, and one cycle of a second sinusoid wave of period $\tau_2$ and maximum amplitude $A_2$. FIG. 3 shows the variations in the amplitude of the bridge output signal during the corresponding time intervals. For example, during the period $t_0$ to $t_1$ the input signal amplitude is zero and, hence, there is no bridge output signal. At time $t_1$ the input signal amplitude begins to increase, reaching a maximum $A_1$ at time $$t_1 + \frac{\tau_1}{4}$$

The effect of this signal is to unbalance the bridge by changing the effective capacitance of the condenser microphone. This, in turn, causes a high frequency output signal to be produced whose peak amplitude increases, reaching a maximum $B_1$. A quarter of a cycle later, as the input signal passes through zero amplitude, the capacitance of the condenser microphone resumes that value for which the bridge is balanced and the bridge output signal also decreases to zero amplitude. During the second half cycle of the input signal, the pressure upon the condenser microphone is reversed from what it was during the preceding half cycle. This again unbalances the bridge but in a manner to cause a 180 degree phase reversal in the bridge output signal. The correspondence between the signal wave and the bridge output wave over the interval $t_0$ to $t_4$ can readily be seen from FIGS. 2 and 3.

From the above description it is seen that the bridge output signal is a double sideband, suppressed carrier signal of the form $F(t) \sin \omega_p t$, where $F(t)$ is the acoustic input signal. To recover the signal, the bridge output signal and a second component of the pump signal are coupled to a conventional phase detector whose output is an electrical replica of the input acoustic signal.

From the Manley-Rowe relationships, the available power gain produced by the above described system is proportional to $$(w_p/w_s)$$

where $\omega_p$ it the pump frequency and $\omega_s$ is the acoustic signal frequency. Thus, the pumped reactive bridge operates as a parametric frequency converter, producing large power gain.

Figure 4:
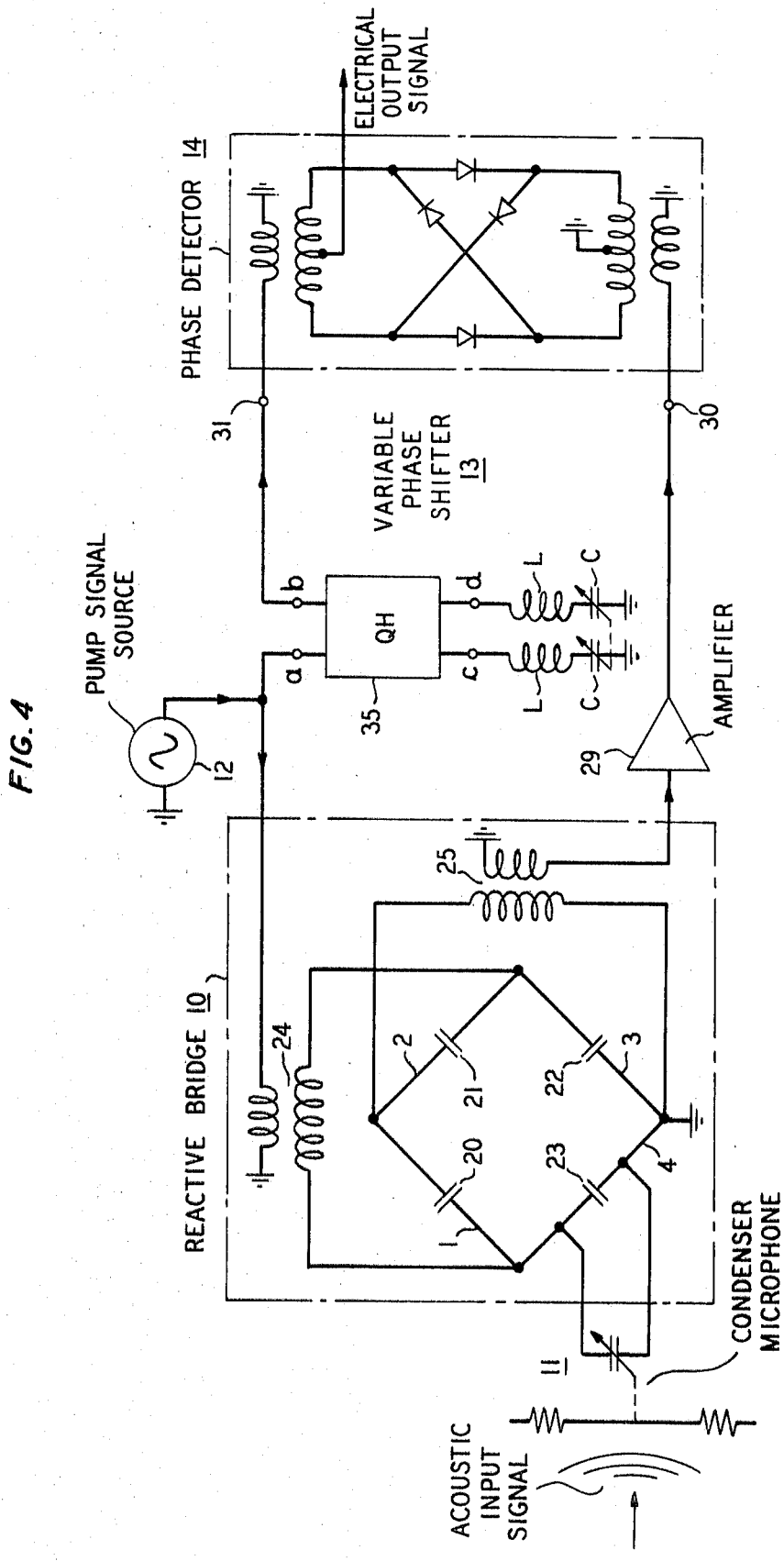
FIG. 4 shows an illustrative implementation of the embodiment of FIG. 1.

FIG. 4, included for purposes of illustration, shows the embodiment of FIG. 1 in somewhat greater detail. To facilitate comparison, corresponding identification numerals are used in the two figures for corresponding components. Basically, all of the components shown in the block diagram of FIG. 1 can be standard circuits. Thus, for example, reactive bridge 10 can have the common Wheatstone configuration, including capacitive elements 20, 21, 22 and 23 in each of its four bridge arms 1, 2, 3 and 4, respectively, with one of said arms 4 including condenser microphone 11.

Pump signal, derived from pump source 12 is coupled across one pair of opposite bridge modes by means of a transformer 24. The bridge output signal is extracted across the other pair of opposite bridge modes by means of a second transformer 25. Advantageously, transformers 24 and 25 are tuned to the pump frequency and an amplifier 29 is included in the bridge signal wavepath to increase the bridge output signal to a level adequate to drive the phase detector. The latter can be any one of a variety of phase detectors as shown for example, in vol. 21 of the Massachusetts Institute of Technology Radiation Laboratory Series, "Electronic Instruments," p. 385. In the particular detector disclosed in FIG. 4, the suppressed carrier, double sideband signal derived from bridge 10 is coupled to one detector input port 30, and a component of the pump signal is coupled to the other detector input port 31. The component of pump signal supplies the missing carrier signal. To insure that the latter is supplied in the proper phase, a variable phase shifter is included in one of the detector input signal paths. In the illustrative embodiments, phase shifter 13, which is included in the pump signal path, comprises a quadrature coupler 35 having two pair of conjugate ports $a$–$b$ and $c$–$d$. One pair of ports $a$–$b$ constitute the input and output ports. Each of the second pair of ports, $c$–$d$, are terminated in identical, series L–C circuits, tunable to the pump signal frequency. The phase shift between ports $a$ and $b$ is varied by simultaneously detuning the L–C circuits. As shown, thsi can be done by tuning the two capacitors which, conveniently, are ganged together.

Figure 5:
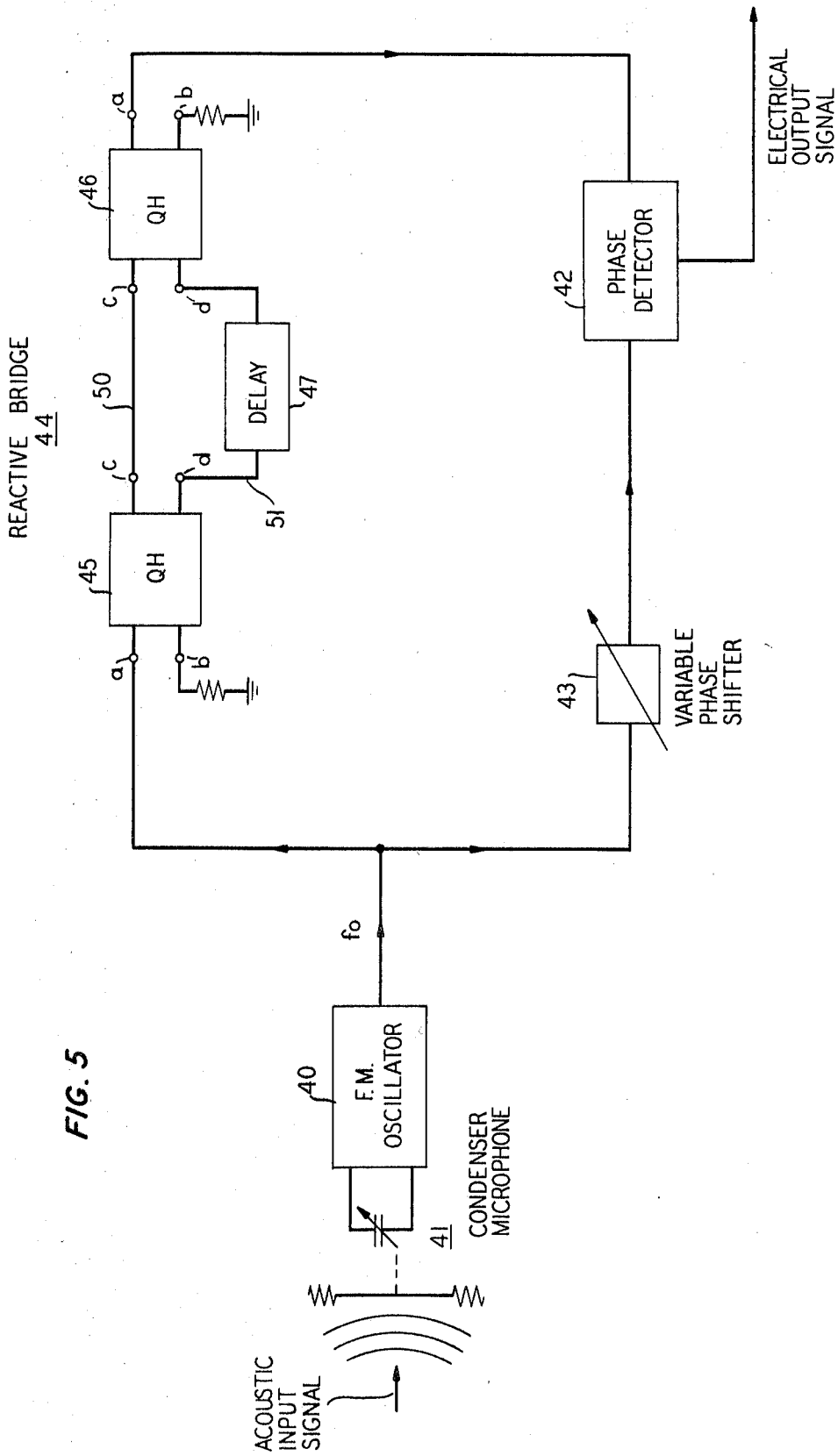
FIG. 5 shows, in block diagram, a second embodiment of the invention.

FIG. 5 shows a second embodiment of a parametric acoustic wave sensor comprising a high frequency pump oscillator 40 whose frequency is frequency modulated by a means of a condenser microphone 41. The output from oscillator 40 is divided into two components, one of which is coupled to a phase detector 42 by means of a variable phase shifter 43. The other component is coupled to a reactive bridge 44 comprising two 3 db hybrid couplers 45 and 46 and delay network 47.

Each of the hybrids has two conjugate ports $a$–$b$ and $c$–$d$, of which port $a$ of hybrid 45 is the input port and port $a$ of hybrid 46 is the output port. The latter is coupled to phase detector 42. Ports $c$ and $d$ of hybrid 45 are connected to ports $c$ and $d$ respectively, of hybrid 46 by means of wavepaths 50 and 51 having substantially different electrical lengths. In particular, wavepath 51 is many wavelengths longer than wavepath 50 due to the additional delay 47. Ports $b$ of the two hybrids are resistively terminated.

In operation, and in the absence of an acoustic input signal, oscillator 40 oscillates at a frequency $f_0$. One component of this signal is coupled to phase detector 42. The other component is coupled to port $a$ of hybrid 45 wherein it is further divided into two equal portions. One portion propagates along wavepath 50 to port $c$ of hybrid 46. The other portion propagates along wavepath 51 to port $d$ of hybrid 46. By adjusting the relative phase delay along these two paths, the two signal portions are made to recombine in port $b$ of hybrid 46, producing no output signal at output port $a$, and hence, no electrical output signal at the phase detector output.

In the presence of an acoustic input signal, condenser microphone 41 frequency modulates oscillator 40 causing the frequency of the signals propagating along wavepaths 50 and 51 to vary in response to the amplitude variations of the acoustic input signal. This causes a variation in relative phase of the two signal portions at ports $c$ and $d$ of hybrid 46. In particular, because delay 47 is large, small changes in frequency produce large changes in phase, resulting in a large signal being coupled to output port $a$ of hybrid 46. For example, with an added delay equivalent to $2N\pi$ radians at frequency $f_0$, the amplitude of the output signal at port $a$ is equal to $$2\pi N \frac{df}{f}$$

where $df/f$ is the fractional change in the signal frequency.

It will be noted that in this second embodiment of the invention, the reactive bridge is unbalanced by changing the pump signal frequency. This, it is apparent that the present invention can be implemented in a variety of ways. Hence, it will be understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

We claim:
1. An electromagnetic parametric acoustic wave sensor comprising:
    a reactive bridge;
    a high frequency electromagnetic pump source;
    and a phase detector;
    means for coupling said pump source to said bridge and to said detector;
    means for coupling the output from said bridge to said detector;
    and means comprising an acoustic wave transducer for producing an imbalance in said bridge;
    characterized in that:
        in the absence of an acoustic input wave, said bridge is balanced, producing no output signal;
        and in that said bridge is unbalanced in the presence of an acoustic input wave, thereby producing a double sideband, suppressed carrier output signal.

2. The sensor in accordance with claim 1 wherein said bridge has a Wheatstone bridge configuration having four reactive branches;

and wherein one of said branches includes an acoustic wave transducer.

3. The sensor according to claim 2 wherein the signal derived from said pump source is a constant frequency signal.

4. The sensor according to claim 1 wherein said bridge comprises:

a pair of 3 db hybrid couplers, each of which has two pair of conjugate ports;

one port of one pair of conjugate ports of the first of said hybrids being the input for said bridge;

one port of one pair of conjugate ports of the second of said hybrids being the output port for said bridge;

the other port of said one pair of ports of each of said hybrids being resistively terminated;

and a pair of wavepaths having substantially different electrical lengths connecting the other pair of conjugate ports of said first hybrid to the other pair of conjugate ports of said second hybrid.

5. The sensor according to claim 4 wherein said pump source is a frequency modulatable oscillator;

and wherein said acoustic wave transducer is coupled to said oscillator, thereby frequency modulating said oscillator in accordance with said acoustic input wave.

6. A parametric microphone comprising:

a reactive bridge including in one branch thereof, a condenser microphone;

a high frequency electromagnetic pump source;

a phase detector;

means for coupling said source to a first pair of opposite bridge nodes;

means, connected across the second pair of opposite bridge nodes, for coupling an electromagnetic signal out of said bridge in response to an acoustic signal received by said condenser microphone;

and means for coupling said pump source and said electromagnetic signal to said phase detector to produce an electromagnetic replica of said acoustic signal.

References Cited

UNITED STATES PATENTS

| | | | |
|---|---|---|---|
| 2,562,640 | 7/1951 | Reason | 332—2 |
| 2,968,695 | 1/1961 | Corliss et al. | 332—47X |
| 2,977,569 | 3/1961 | Harris | 332—2X |

ALFRED L. BRODY, Primary Examiner

U.S. Cl. X.R.

179—1; 332—44, 47